United States Patent

[11] 3,622,555

| [72] | Inventors | Raymand A. Rothenbury;<br>Richard W. Ford, both of Sarnia, Ontario, Canada |
|---|---|---|
| [21] | Appl. No. | 829,805 |
| [22] | Filed | June 2, 1969 |
| [45] | Patented | Nov. 23, 1971 |
| [73] | Assignee | The Dow Chemical Company<br>Midland, Mich. |

[54] METHOD FOR PRODUCING LOW BULK DENSITY, FREE-FLOWING POLYMER POWDERS
12 Claims, No Drawings

[52] U.S. Cl. .................................................. 260/94.9,
260/86.1, 260/86.7, 260/88.2, 260/88.7, 260/89.1,
260/89.5, 260/96, 260/93.5, 260/93.7

[51] Int. Cl. ........................................................ C08d 5/00,
C08f 1/88, C08f 47/02

[50] Field of Search ............................................. 260/94.9 G,
7, 96, 93.5 A, 93.7, 88.2 S, 89.5 S

[56] References Cited
UNITED STATES PATENTS

| 3,101,329 | 8/1963 | Sweeney ...................... | 260/94.9 |
| 3,422,049 | 1/1969 | McClain ...................... | 260/94.9 X |
| 3,432,483 | 3/1969 | Peoples et al ................ | 260/87.3 |
| 2,870,113 | 1/1959 | Jones .......................... | 260/94.9 X |

*Primary Examiner*—Joseph L. Schofer
*Assistant Examiner*—William F. Hamrock
*Attorneys*—Griswold & Burdick, R. G. Waterman and L. J. Dankert ABSTRACT: Free-flowing powders of normally solid, thermoplastic organic polymers, e.g., polyethylene, having decreased bulk densities are prepared by (1) dispersing a particulate form of the thermoplastic polymer in a nonsolvent liquid medium containing a nonionic wetting agent, (2) heating the resulting dispersion to a temperature from about 10° C. below the Vicat softening point to about the Vicat softening point of the polymer while subjecting the dispersion to agitation and (3) cooling the dispersion under continued agitation. Such powers are useful in flame spraying, fluid-bed coating and the like.

METHOD FOR PRODUCING LOW BULK DENSITY, FREE-FLOWING POLYMER POWDERS

BACKGROUND OF THE INVENTION

This invention relates to the preparation of free-flowing thermoplastic powders having decreased bulk densities from thermoplastic polymer powders that are generally poor flowing and have somewhat higher bulk densities.

Dry, free-flowing high bulk density powders of thermoplastic polymers are used extensively in the production of thin sheets, films, coatings, rotationally molded articles and the like. Processes for preparing these free-flowing, high bulk density powders generally require precipitating the polymer from liquid mixture of solvent and nonsolvent. In one case, the polymer is precipitated by distilling off the lower boiling polymer solvent. Recently in U.S. Pat. No. 3,189,588, a poly-α-olefin powder having increased bulk density was prepared by slurrying a lower bulk density poly-α-olefin containing residual inert organic solvent in water, heating the slurry at 5° to 15° C. below the Vicat softening point of the poly-α-olefin, and removing the solvent by rapidly azeotroping with water.

More recently, uses for low bulk density, free-flowing powders of thermoplastic organic polymers, particularly ethylene polymers, have arisen, for example, in the production of lightweight insulative materials and in other applications such as flame spraying and the like. In general, low bulk density powders are prepared by a grinding process which converts the polymer into a powder having irregularly shaped particles which are characteristically poor flowing. In addition, such methods usually do not produce powders having extremely low bulk densities, e.g., bulk densities in the range from about 5 to 12 pounds/cubic foot.

Inasmuch as an efficient method for producing low bulk density, free-flowing powders of thermoplastic polymers has not been heretofore known to the art, it would be highly desirable to provide a method for producing powders having such characteristics.

SUMMARY OF THE INVENTION

Accordingly, the present invention is a method for producing low bulk density, free-flowing powders of normally solid, thermoplastic organic polymers, said method, hereinafter described in detail, comprising the steps of (1) dispersing a finely divided powder of a normally solid, water-insoluble, thermoplastic organic polymer in a nonsolvent liquid dispersing medium containing from about 0.1 to about 100 volume percent based on the medium volume of a nonionic wetting agent, the remaining portion of the medium being aqueous liquid; (2) heating the resulting dispersion to a temperature ranging from about 10° C. below the Vicat softening point to about the Vicat softening point of the polymer while subjecting the dispersion to agitation and (3) cooling the dispersion under continued agitation to form free-flowing particles having a lower bulk density than the starting powder, e.g., from about one-fourth to about three-fourths times that of the starting powder. As a further proviso, when the wetting agent is a polyoxyalkylene agent, the liquid medium contains from about 0.1 to about 1 volume percent based on the medium volume of the wetting agent.

The particles produced in the practice of this invention are useful in the production of insulative materials and in static or fluidized dip coating, spraying, dusting and flame spraying applications.

DESCRIPTION OF THE PREFERRED EMBODIMENTS

The process of this invention requires, as starting materials, a finely divided powder of a normally solid, water-insoluble, thermoplastic organic polymer and a nonsolvent liquid dispersing medium containing a nonionic wetting agent.

Free-flowing, low bulk density particles of any water-insoluble thermoplastic organic polymer may be prepared by the method of this invention. Illustrative of such polymers include the polymers of α-olefins such as ethylene, propylene, 1-butene, 1-hexene, and the like; polymers of monovinylidene aromatic compounds such as styrene, ar-methylstyrene, α-methylstyrene, t-butylstyrene and the like; polymers of the alkyl acrylates and derivatives thereof, such as ethyl acrylate, methyl methacrylate, n-butyl acrylate, acrylonitrile and the like; polymers of other ethylenically unsaturated monomers such as vinyl acetate and the like; and copolymers of above-listed monomers such as ethylene and butene-1, ethylene and ethyl acrylate, styrene and butyl acrylate, ethyl acrylate and methyl methacrylate, α-methyl styrene and 2-ethylhexyl acrylate and the like. Methods for the preparation of these polymers and copolymers are described fully in Schildknecht, Polymer Processes, Vol. X (1956).

For the purposes of this invention, the term "nonionic wetting agent" is defined as a compound or polymer in which the molecular structure has both a lipophilic portion and a hydrophilic portion. Nonionic wetting agents suitable for the purposes of this invention are also essentially nonsolvents for the particular polymer to be employed. Representative of suitable nonionic wetting agents include mono- and polyhydric compounds, e.g., aliphatic alcohols such as methanol, ethanol, n-propanol, isopropanol, n-butanol, n-pentanol, cyclohexanol, and the like; dihydric alcohols such as ethylene glycol, propylene glycol, butylene glycol and the like; trihydric alcohols of which glycerol is typical; and the highly polyhydric alcohols such as the hexahydric alcohols, sorbitol and mannitol. Suitable nonionic surface active agents also include the polyoxyalkylene agents, e.g., ethylene glycol polyethers, ethylene nonyl phenol polyethers, alkylphenoxypolyoxyethylene ethanol and the like; the fatty acid esters of polyhydric alcohols, e.g., propylene glycol fatty acid ester; and other nonionic wetting agents set forth in Becher, Emulsions: Theory and Practice, 2nd ed., Reinhold Publishing Corporation, New York, 221–225 (1965). Other suitable nonionic surface active agents include acetone, methyl ethyl ketone and the like. In most instances the monohydric alcohols, e.g., n-propanol, and the polyoxyethylene agents, e.g., alkylphenoxypolyoxy ethylene ethanol, are preferred.

Water and aqueous solutions of various electrolytes and the like are the aqueous liquids which comprise the remaining portion of the nonsolvent liquid dispersing medium, i.e., from about 0 to about 99.9 volume percent based on the liquid medium. The presence of electrolyte or other material in the aqueous medium is optional. When used, the electrolyte or other material is usually present in small amounts ranging from about 0.001 to about 1.0 weight percent based on the polymer.

The method of this invention is carried out by first dispersing the starting fine powder of polymer in an aqueous dispersing medium containing from about 0.1 to about 100 volume percent of a specified nonionic wetting agent based on the volume of the medium. When a monohydric alcohol is employed as the wetting agent, it is preferred to use it in concentrations ranging from about 1 to about 100 volume percent, especially from about 2 to about 20 volume percent. Polyoxyalkylene agents are employed in concentrations ranging from about 0.1 to about 1 volume percent, preferably from about 0.2 to about 0.5 volume percent.

For the purposes of this invention, the ratio of liquid dispersing medium to polymer powder is such that a stirrable slurry results. Good results, i.e., particles having free-flowing properties and low bulk density, are obtained with medium-to-powder ratios ranging from 1:1 to about 500:1 by weight, with the best results obtained in suspensions having medium-to-powder ratios from about 5:1 to about 100:1. The polymer powder is dispersed in the aqueous dispersing medium with any conventional mixing apparatus, for example, a baffled tank equipped with stirring means.

In a step subsequent to the dispersing step, the dispersion is suitably heated to a temperature from about 10° C. below the Vicat softening point to about the Vicat softening point of the particular polymer, preferably from about 5° to about 2° C. below said Vicat softening point. It is generally sufficient for the purposes of this invention to maintain the dispersion at a temperature within the suitable range for a period of 2 minutes or more. However, it is understood that the method of this invention can be successfully performed by heating the dispersion at a suitable temperature for several hours, e.g., up to four hours. It is also generally desirable to conduct the heating step in a closed vessel and at pressures sufficient to maintain the nonsolvent dispersing medium in the liquid state. Pressures from about 20 to about 200 pounds per square inch (p.s.i.) are generally sufficient to accomplish this end. Throughout the heating step the suspension is agitated at a rate such that the particles of the starting powder are not permitted to agglomerate into larger masses. The desired rate for a particular system can be readily determined by the skilled artisan. As an illustration of the invention and not for the purposes of limitation, the rates of agitation suitable for small reaction vessels equipped with loop stirrers or pitched blade stirrers and having a total volume from about 5 to 10 liters range from about 200 to 1,400 r.p.m. In preferred embodiments, in addition to centrifugal motion, the agitation has an up-and-down motion which keeps the polymer dispersed throughout the suspending medium. This desired up-and-down portion is accomplished with pitched blade stirrers; however, adequate up-and-down motion can also be achieved with loop stirrers and the like. As a general rule, the particular rate of agitation has less influence than the aqueous dispersing medium so long as it is sufficient to prevent agglomeration into larger masses.

Subsequent to the heating step, the dispersion is cooled while continuing the same or nearly the same rate of agitation used in the heating step. Agitation is generally continued until the heat-softened particles of the powder cool to hardness thereby losing their tacky character which is the primary cause of unwanted agglomeration. The method of cooling and rate of cooling are not critical in the practice of this invention so long as the specified agitation rate is maintained until the heat-softened particles become sufficiently hard.

The resulting free-flowing, low bulk density particles are separated from the liquid dispersing medium and washed free of the wetting agent, etc., for example, by washing with water. In general the resulting particles are porous spheroids having average diameters 4 to 10 times greater than that of the starting particles, for example, the resulting particles usually have diameters ranging from about 400 to about 1,000 microns. In all instances, however, the resulting particles have both free-flowing properties and lower bulk density than that of the starting powder.

The following examples are given to illustrate the invention and are not intended to limit the scope thereof.

EXAMPLES 1–4

A 20-g. portion of powdered polyethylene (Melt Index = 6.0, Vicat softening point = 122.5° C., molded density = 0.955) having an average particle diameter of about 125 microns and a bulk density of 15 lb./ft.$^3$ is charged to a 3-liter glass-pipe agitated reactor containing 2 liters of a 20 volume percent solution of $n$-propanol in water. The resulting slurry is gradually heated with stirring (approximately 300 r.p.m.) to 118–119°C. and a reactor pressure of 32–34 p.s.i.g. These conditions of temperature and pressure are maintained for 10 minutes, and the slurry is then allowed to cool under continued agitation. The cooled slurry is removed from the reactor and centrifuged. The particles are separated from the aqueous solution of $n$-propanol and dried in a vacuum oven at 90° C. The dried particles form a free-flowing powder having a bulk density of 8.3 lb./ft.$^3$ The results are also shown in table I.

For the purposes of comparison and to particularly point out the advantages of the invention, a control run (C) is carried out in which starting materials and procedure are in accordance with example 1 except that water is used instead of the $n$-propanol solution. The properties of the resulting particles are shown in table I.

To further illustrate the invention, examples 2–4 are carried out essentially according to example 1 except that the amount and/or type of nonionic wetting agent are varied. The properties of the resulting beads are shown in table I.

The Vicat softening point of the polymer is the lowest temperature at which a flattened needle of 1-mm.$^2$ circular cross section will penetrate the polymer to a depth of 1 mm. under a specified load using a selected uniform rate of temperature rise. A more complete description of the test method and conditions is given by ASTM D–1525–65T.

TABLE I

| Example No. | Non-ionic wetting agent | | Flow properties | Bulk density |
|---|---|---|---|---|
| | Type | Conc., vol. percent | | |
| 1 | n-Propanol | 20 | Free-flowing | 8.3 |
| 2 | do | 2.2 | do | 11.8 |
| 3 | do | 100 | do | 6.4 |
| 4 | Igepal [1] | 0.25 | do | 10.9 |
| C [2] | None | | Not free-flowing | 15.3 |

[1] Alkylphenoxypolyoxyethylene ethanol.
[2] Not an example of the invention.

What is claimed is:

1. A method for preparing low bulk density, free-flowing powders of normally solid, water-insoluble, thermoplastic organic polymers, said method comprising the steps of (1) dispersing a finely divided powder of a normally solid, water-insoluble, thermoplastic organic polymer in a nonsolvent liquid dispersing medium in proportions such that a stirrable slurry results, said dispersing medium containing from about 0.1 to about 100 volume percent based on the volume of the medium of a nonionic wetting agent which is a nonsolvent for the polymer, the remaining portion of the medium being an aqueous liquid, with the proviso that when the wetting agent is a polyoxyalkylene agent the medium contains from about 0.1 to about 1 volume percent of the wetting agent; (2) heating the resulting dispersion to a temperature ranging from about 10° C. below the Vicat softening point to about the Vicat softening point of the polymer until the particles of said powder are heat-softened while subjecting the dispersion to agitation at a rate only sufficient so that the particles of said powder do not agglomerate into large masses; and (3) cooling the dispersion under continued agitation until the resulting heat-softened particles of powder harden.

2. The method according to claim 1 wherein the wetting agent is aliphatic alcohol.

3. The method according to claim 2 wherein the alcohol is $n$-propanol.

4. The method according to claim 2 wherein the medium contains from about 2 to about 20 volume percent of the aliphatic alcohol.

5. The method according to claim 1 wherein the wetting agent is a polyoxyethylene agent.

6. The method according to claim 5 wherein the polyoxyethylene agent is an alkyl phenoxypolyoxyethylene ethanol.

7. The method according to claim 5 wherein the medium contains from about 0.2 to about 0.5 volume percent of the polyoxyethylene agent.

8. The method according to claim 1 wherein the polymer is an olefin polymer.

9. The method according to claim 8 wherein the olefin polymer is polyethylene.

10. The method according to claim 1 comprising the steps of (1) dispersing a finely divided powder of polyethylene in an aqueous medium in proportions such that the medium-to-powder ratio is from about 5:1 to 100:1 by weight, said aqueous medium containing about 2 to about 20 volume percent based on the medium of $n$-propanol, (2) heating the resulting dispersion to a temperature ranging from about 5° to 2° C. below the Vicat softening point of the polyethylene for at least two minutes while subjecting the dispersion to agitation at a rate only sufficient so that the particles of said powder do not agglomerate and (3) cooling the dispersion under continued agitation until the resulting heat softened particles of said powder harden.

11. A method according to claim 1 for preparing low bulk density, free-flowing powders of a normally solid, water-insoluble, thermoplastic organic polymer selected from the group consisting of the homopolymers and copolymers of the following monomers; α-olefins, monovinylidene aromatic compounds, alkyl acrylates and derivatives thereof, and vinyl acetate, said method comprising the steps of (1) dispersing a finely divided powder of the normally solid, water-insoluble, thermoplastic organic polymer in a nonsolvent liquid dispersing medium in proportions such that a stirrable slurry results, said dispersing medium containing from about 0.1 to about 100 volume percent based on the volume of the medium of a nonionic wetting agent which is a nonsolvent for the polymer, said agent selected from the group consisting of aliphatic monohydric alcohols, dihydric alcohols, trihydric alcohols, polyhydric alcohols and polyoxyalkylene, the remaining portion of the medium being water, with the proviso that when the wetting agent is a polyoxyalkylene the medium contains from about 0.1 to about 1 volume percent of the wetting agent; (2) heating the resulting dispersion to a temperature ranging from about 10° below the Vicat softening point to about the Vicat softening point of the polymer until the particles of said polymer are heat-softened while subjecting the dispersion to agitation at a rate only sufficient so that the particles of said powder do not agglomerate into large masses; and (3) cooling the dispersion under continued agitation until the resulting heat-softened particles of powder harden.

12. The method according to claim 11 wherein the thermoplastic organic polymer is selected from the group consisting of homopolymers and copolymers of α-olefins and the wetting agent is selected from the group consisting of methanol, ethanol, n-propanol, isopropanol, n-butanol, n-pentanol, cyclohexanol, ethylene glycol, propylene glycol, butylene glycol, glycerol, sorbitol, mannitol, ethylene glycol polyether, ethylene nonyl phenol polyether, alkyl phenoxypolyoxyethylene ethanol, and propylene glycol fatty acid ester.

* * * * *